United States Patent [19]

Schreck

[11] Patent Number: 5,446,287
[45] Date of Patent: Aug. 29, 1995

[54] CENTER PHOTODETECTOR DETERMINATION IN A DIGITAL SCINTILLATION CAMERA

[75] Inventor: Zoltan Schreck, Ville de Léry, Canada

[73] Assignee: Park Medical Systems Inc., Quebec, Canada

[21] Appl. No.: 357,188

[22] Filed: Dec. 13, 1994

[51] Int. Cl.[6] .................................... G01T 1/208
[52] U.S. Cl. .......................... 250/369; 364/413.24; 250/366
[58] Field of Search .................. 250/366, 369; 364/413.24

[56] References Cited

U.S. PATENT DOCUMENTS

| | | | |
|---|---|---|---|
| 3,594,577 | 7/1971 | Leveday | 250/366 |
| 4,672,542 | 6/1987 | Reux et al. | 364/413.24 |
| 5,293,044 | 3/1994 | Klingenbech-Regh et al. | 250/369 |
| 5,309,357 | 5/1994 | Stark et al. | 364/413.24 |

Primary Examiner—Paul M. Dzierzynski
Assistant Examiner—David Vevnon Bruce
Attorney, Agent, or Firm—Michael D. Bednarek; Marks & Murase

[57] ABSTRACT

Digital intensity values from a planar array of photodetectors optically coupled to a scintillator in a digital electronic scintillation camera are compared to one another from most significant bit down to least significant bit in order to determine within the limits of precision of the digital values which photodetector has the maximum light intensity. Center photodetector determination is an important part of efficient position calculation in a scintillation camera.

5 Claims, 1 Drawing Sheet

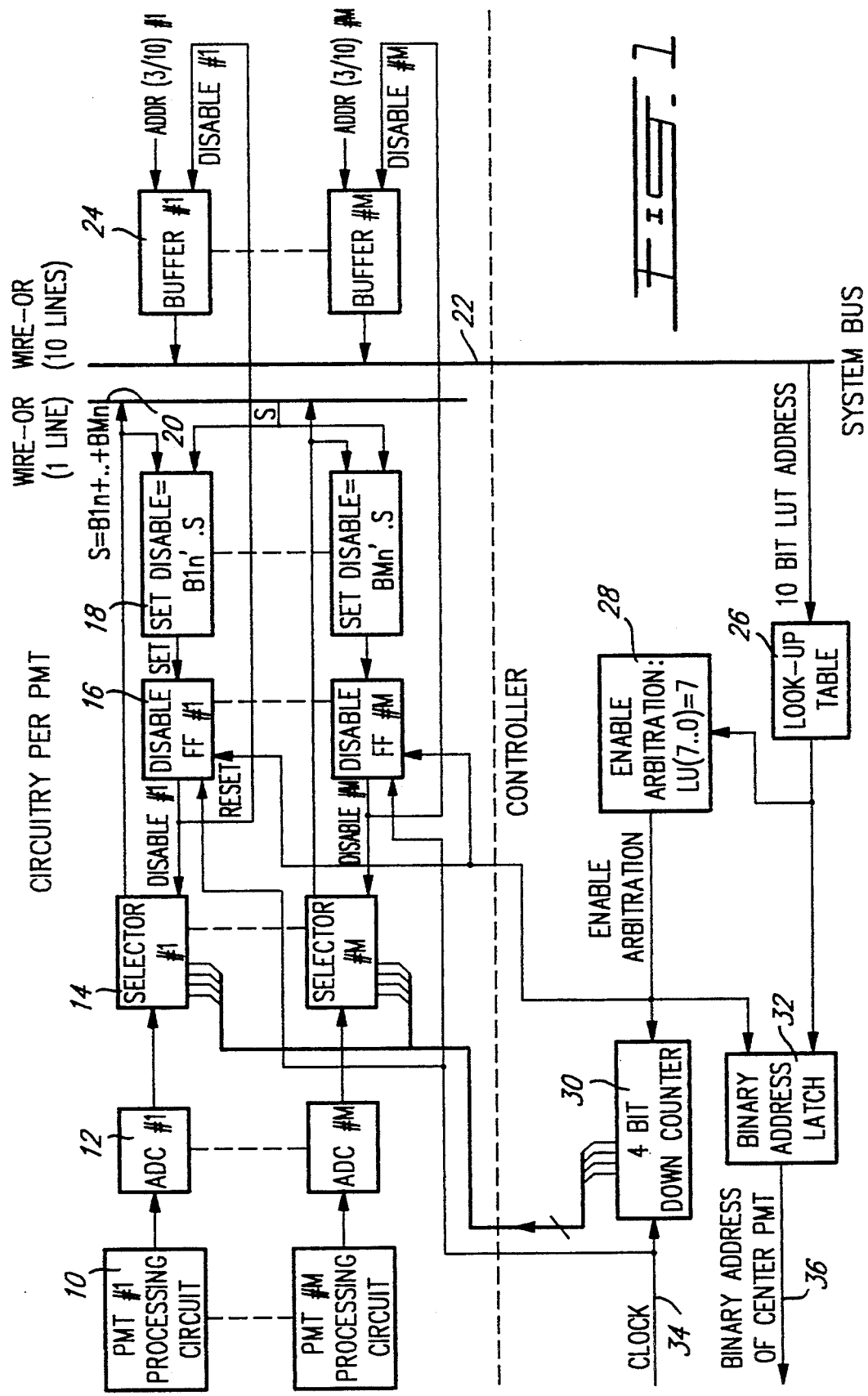

CENTER PHOTODETECTOR DETERMINATION IN A DIGITAL SCINTILLATION CAMERA

FIELD OF THE INVENTION

The present invention relates to a method and apparatus for determining which of a plurality of photodetectors arranged in a planar array has the greatest intensity value, i.e. which photodetector is nearest the center of a scintillation. More specifically, the invention relates to a digital scintillation camera in which the photodetector intensity signals have been converted to digital intensity values.

BACKGROUND OF THE INVENTION

Center photodetector determination in a scintillation camera is an important function where the light intensity signals are to be analyzed digitally. It is known in the art to use analog comparators in order to determine whether a given photodetector in a planar array of photodetectors has a signal greater than its neighboring photodetectors. This results in the generation of a center photodetector signal, however, such an analog circuit does not indicate whether the center photodetector has the greatest intensity of all photodetectors in the array.

Furthermore, an analog scheme for intensity value comparison can only be successful if the gain of the photodetectors is accurately adjusted. Such a system is known from U.S. Pat. No. 5,309,357, in which there is also disclosed with reference to FIG. 3 thereof, the use of serial analog-to-digital converters for the intensity signals from each photodetector. When a first bit is received from the serial analog-to-digital converters, the photodetector first generating such bit is assumed to be at least near the center of the scintillation event. The data acquisition system then resets the analog-to-digital converters remote from a group of photodetectors surrounding the one detector whose serial analog-to-digital converter produced the first high value. The disclosed system improves conversion throughput but does not provide an accurate determination of which photodetector has received the greatest light intensity and can be considered the center tube. The system described in U.S. Pat. No. 5,309,357 determines which photodetector has the greatest intensity value within an order of binary magnitude.

SUMMARY OF THE INVENTION

It is accordingly an object of the present invention to provide a method and apparatus for determining which photodetector in a planar array of photodetectors has received the most light from a scintillation event in a digital electronic scintillation camera.

Broadly stated, the invention provides for a method and apparatus involving the comparison of digital intensity values from most-significant bit (MSB) down to least-significant bit (LSB) in order to determine within the limits of precision of the digital values which photodetector has the maximum light intensity.

According to the invention, there is provided an apparatus for generating a center photodetector identification signal based on a plurality of digital photodetector intensity values from a planar array of photodetectors receiving gamma ray scintillation light from a scintillator. The apparatus comprises means for generating, one at a time, a like plurality of logical signals for each bit representing the plurality of digital photodetector intensity values from MSB to LSB, OR means for generating a logical OR result of the logical signals, means associated with each photodetector for disconnecting, until after the identification signal is generated, the logical signal of each associated photodetector from the OR means when the OR result is '1' and the associated logical signal is '0', and means for detecting when only one of the photodetectors has an associated logical signal connected to the OR means, and for generating a center photodetector identification signal identifying the last one of the photodetectors.

The generating means may be provided by a serial bus from the analog-to-digital converter, or may comprise a circuit for generating the logical signals for each bit from the plurality of digital values being already stored in a register. In particular, the generating means may include a selector circuit for producing a logical signal of a bit from a value stored in a digital register for the bit identified by a digital bit number input, and the bit number input can be connected to a counter which will count from the MSB to the LSB. Since the OR means compare a plurality of logical signals, it may be a simple wire-OR configuration or it may comprise an OR gate circuit.

The disconnecting means may comprise an exclusive-OR-gate whose output is connected to a disable flip-flop whose output is in turn connected to a circuit for disconnecting the logical signal of the particular circuit associated with the photodetector from the OR means. At the end of generating the center photodetector identification signal, the flip-flop circuit can be reset.

The detecting means may preferably comprise a digital identification number generator associated with each photodetector whose output is connected to a bus. The identification numbers are selected such that they are made of binary digits having a same number of 1's, and the detecting means may look at the identification number present on the bus. If the identification number present on the bus has the predetermined number of 1's, it is determined that there is only one of the photodetectors having an associated logical signal connected to the OR means and the identification number on the bus is taken as the center photodetector identification signal.

BRIEF DESCRIPTION OF THE DRAWING

The invention will be better understood by way of the following detailed description of a preferred embodiment with reference to the appended drawing in which:

FIG. 1 is a schematic block diagram of the center photodetector identification circuit according to the preferred embodiment.

DETAILED DESCRIPTION OF THE PREFERRED EMBODIMENT

A photodetector or photomultiplier tube from a planar array of photomultiplier tubes numbered 1 through M are connected to corresponding processing circuits 10 whose outputs are fed to analog-to-digital converters 12. The processing circuits typically include integrators and are usually connected to the output of a sum signal discriminator (not shown) for the purposes of outputting a signal only when it is determined that a useful scintillation has taken place. The outputs of the ADCs 12 may optionally be fed to a digital gain adjustment circuit 13 and to a FIFO stack circuit 15 before being fed to a plurality of M selector circuits 14. The selector circuits 14 may include a memory register for storing the digital value of the intensity signals coming from the ADCs 12.

In the preferred embodiment, the analog-to-digital converter is an ADC-12062 or similar device, whose output is a 12-bit result on a parallel bus. The selector circuits 14 have an input coming from a 4-bit down counter 30 which counts from 11 down to 0 with every clock pulse on line 34. The selector circuit 14 outputs a logical one or zero signal in accordance with the digital value in its register for the bit number indicated by counter 30. The logic signals are wire-OR-ed on a wire 20 with inverse logic in which a 1 is a low-state and a 0 is a high-state.

A set disable circuit 18 goes high if the output of the selector is a 0 while the OR result is a 1. Circuit 18 could alternatively comprise an exclusive OR gate. The output from circuit 18 sets a disable flip-flop 16 synchronously with 4-bit counter. The output of flip-flop 16 is fed to selector 14 and to address buffer circuits 24. Initially, the disable outputs from flip-flop 16 are LO and all buffer circuits 24 output a unique digital address on a 10-line wire-OR bus 22. The addresses contain three 1's and uniquely identify a given photomultiplier tube. A look-up table circuit 26 translates the 10-bit address present on the bus 22 and outputs a binary address based on the 10-bit address. If the address on bus 22 has more than three 1's, a predetermined output, e.g. 7, is generated. The enable arbitration circuit 28 checks the binary address output from the look-up table circuit 26 and when it is not an address representing a unique PMT, the enable arbitration signal is kept HI. When the result from the look-up table circuit 26 is that of the binary address of a single PMT, the enable arbitration output from circuit 28 goes LO, latching the binary address at latch 32 onto output 36 and resetting the disable flip-flop 16 and the 4-bit counter.

As can be appreciated, the means for detecting when only one of the photodetectors has an associated logical signal connected to the OR means could be an analog circuit instead of a digital one. Such an analog circuit could be one in which the amount of current contribution to the wire-OR is measured to determine when a given selector circuit is providing the only logical one of all selector circuits 14.

I claim:

1. An apparatus for generating a center photodetector identification signal based on a plurality of digital photodetector intensity values from a planar array of photodetectors receiving gamma ray scintillation light from a scintillator, comprising:

means for generating one at a time a like plurality of logical 0/1 signals for each bit representing said plurality of values from most-significant to least-significant bit;

OR means for generating a logical OR result of said logical signals;

means associated with each photodetector for disconnecting, until after said identification signal is generated, said logical signal of each associated photodetector from said OR means when said OR result is 1 and said associated logical signal is 0; and means for detecting when only one of said photodetectors has an associated logical signal connected to said OR means, and for generating a center photodetector identification signal identifying said last one of said photodetectors.

2. The apparatus as claimed in claim 1, wherein said detecting means comprises a wire-OR parallel bus connected to a plurality of unique address generators connected to said disconnecting means, said generator including means for disconnecting signals representing said address from said parallel bus in response to disconnection of said logical signal of each associated photodetector from said OR means, said address comprising a predetermined number of logical 1's, and look-up means for generating an enable arbitration signal in response to detecting more than said predetermined number of logical 1's on said parallel bus, said enable arbitration signal being connected to said generating means, and for generating the center photodetector identification signal in response to detecting that said parallel bus contains an address signal having said predetermined number of logical 1's.

3. The apparatus as claimed in claim 1, wherein said generating means comprise a down counter connected to a clock pulse for down counting from said most significant bit to said least significant bit, an output of said down counter being connected to bit selector circuits connected to said plurality of digital photodetector intensity values.

4. The apparatus as claimed in claim 2, wherein said generating means comprise a down counter connected to a clock pulse for down counting from said most significant bit to said least significant bit, an output of said down counter being connected to bit selector circuits connected to said plurality of digital photodetector intensity values, said enable arbitration signal being connected to a reset input of said down counter.

5. A method for generating a center photodetector identification signal based on a plurality of digital photodetector intensity values from a planar array of photodetectors receiving gamma ray scintillation light from a scintillator, comprising the steps of:

generating one at a time a like plurality of logical 0/1 signals for each bit representing said plurality of values from most-significant to least-significant bit;

generating a logical OR result of said logical signals;

disregarding, until after said identification signal is generated, said logical signal of each associated photodetector when generating said OR result when said OR result is 1 and said associated logical signal is 0; and detecting when only one of said photodetectors has an associated logical signal not disregarded in generating said OR result, and generating a center photodetector identification signal identifying said last one of said photodetectors.

* * * * *